Nov. 15, 1960     F. W. R. FARROW     2,960,619

CONSTRUCTION OF THERMIONIC VALVES

Filed May 18, 1959

INVENTOR

FREDERICK WILLIAM RODBARD FARROW

BY *Larson and Taylor*

United States Patent Office 2,960,619
Patented Nov. 15, 1960

2,960,619
CONSTRUCTION OF THERMIONIC VALVES

Frederic William Rodbard Farrow, Enfield, England, assignor to Siemens Edison Swan Limited, London, England, a British company Filed May 18, 1959, Ser. No. 813,833

Claims priority, application Great Britain May 28, 1958

2 Claims. (Cl. 313—260)

This invention relates to the construction of thermionic valves. It is concerned with the step in construction in which the valve electrode structure is inserted into its envelope.

It is desirable, when inserting an electrode structure into the valve envelope, to be able to gauge the depth of insertion. In many cases the structure can be inserted as far as possible until it stops. If for any reason the structure must not reach the top of the envelope it must either be inserted and positioned by hand, which is expensive, or else some gauging device must be employed.

It is an object of the present invention to provide such a gauging device.

According to the present invention an arrangement for positioning a valve electrode structure within an envelope comprises an insulating disc carried in fixed spaced relationship to the electrode structure so as to act as a stop against the end of the envelope when the structure is inserted therein.

In a preferred embodiment a wire bridge is provided secured to the end of the electrode structure and said disc is threaded on a wire secured to the bridge and abuts against the bridge. Where a top cap connection is required to a selected electrode the bridge can conveniently be connected to that electrode and the wire on which the mica stop disc is threaded can extend through the envelope to the top cap connection.

Figure 1:
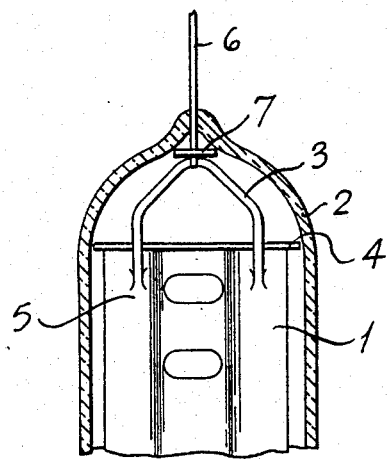
Figure 2:
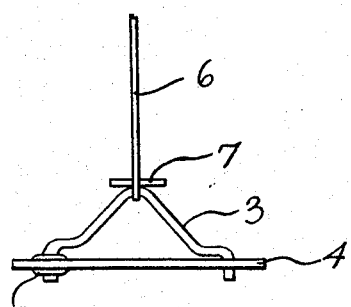

In order that the invention may be more fully understood reference will now be made to the accompanying drawing, in which:

Fig. 1 shows one embodiment of the invention; and
Fig. 2 shows an alternative arrangement.

Referring now to Fig. 1 a valve electrode structure 1 is required to be positioned within an envelope 2 at a predetermined axial position. To achieve this a wire bridge 3 has its two ends passed through the top mica 4 of the electrode structure 1 and is welded to the anode 5 thereof. To the top of the wire bridge is welded a joining wire 6 of the kind used for welding to metal and sealing to glass. The lower end of joining wire 6 consists of nickel or any other metal suitable for welding and the remaining portion consists of borated copper clad wire or any other material suitable for sealing to glass. A small mica disc 7 which may be circular and has a central hole is dropped over wire 6 so that it falls to rest on the top of the wire bridge. This disc 7 acts as a stop for the electrode structure when it is inserted in the envelope. The disc also prevents the metal bridge 3 contacting the walls of envelope 2 and possibly cracking it.

In constructing the valve the electrode structure 1 is placed on the sealing machine and the envelope 2 is dropped over it as far as the mica disc 7 allows. Finally the two ends of the envelope are heated in the usual manner and sealed after which wire 6 is capped.

An alternative arrangement is shown in Fig. 2, in which like parts have like reference numerals. In this arrangement instead of welding both ends of the bridge 3 to the anode, one or both ends thereof may be anchored to the top mica 4 by welding to any suitable fixture such as one or two eyelets 8 in the mica. If only one eyelet is used (as illustrated in the figure) the free end of the bridge wire is shaped to form a stop against the mica 4 through which it passes.

In addition to serving as a height gauge during the sealing-in process the above described arrangement provides a more satisfactory top connector to the anode or any other electrode and can also be used as a getter support.

What I claim is:

1. An arrangement for positioning a valve electrode structure within an envelope comprising a wire bridge, secured to one end of an electrode structure and an insulating disc secured to the bridge so as to act as a stop against the end of the envelope when the structure is inserted therein.

2. A thermionic valve comprising an envelope surrounding an electrode structure, said electrode structure including a wire bridge positioned at one end of the electrode structure and connected to a selected one of the electrodes of said structure, a wire connected to said bridge and extending through said envelope to provide a top cap connection for said selected electrode, and an insulating disc threaded on said wire, one side of said disc abutting against said bridge and the other side of said disc abutting against the internal surfaces of said envelope whereby said disc locates the electrode structure relative to the envelope.

References Cited in the file of this patent

UNITED STATES PATENTS

| 2,478,969 | Ishler | Aug. 16, 1949 |
| 2,666,866 | Prager | Jan. 19, 1954 |

FOREIGN PATENTS

| 144,986 | Australia | Feb. 6, 1952 |